(12) United States Patent
Iwao (10) Patent No.: US 11,268,917 B2
(45) Date of Patent: Mar. 8, 2022

(54) X-RAY INSPECTION APPARATUS

(71) Applicant: Shimadzu Corporation, Kyoto (JP)

(72) Inventor: Yoshihiko Iwao, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/052,527

(22) PCT Filed: May 21, 2018

(86) PCT No.: PCT/JP2018/019543
§ 371 (c)(1),
(2) Date: Nov. 3, 2020

(87) PCT Pub. No.: WO2019/224888
PCT Pub. Date: Nov. 28, 2019

(65) Prior Publication Data
US 2021/0239626 A1 Aug. 5, 2021

(51) Int. Cl.
*G01N 23/00* (2006.01)
*G01N 23/046* (2018.01)

(52) U.S. Cl.
CPC ... *G01N 23/046* (2013.01); *G01N 2223/3307* (2013.01); *G01N 2223/401* (2013.01)

(58) Field of Classification Search
CPC ...... G01N 2223/3307; G01N 2223/401; G06T 3/4069
See application file for complete search history.

(56) References Cited

U.S. PATENT DOCUMENTS

2001/0046331 A1* 11/2001 Altunbasak .......... H04N 1/3935
382/299

FOREIGN PATENT DOCUMENTS

| JP | 2005095328 | 4/2005 |
|---|---|---|
| JP | 2006317249 | 11/2006 |
| JP | 2016517961 | 6/2016 |
| JP | 2016139397 | 8/2016 |
| WO | 2014168796 | 10/2014 |

OTHER PUBLICATIONS

"International Search Report (Form PCT/ISA/210) of PCT/JP2018/019543," dated Jul. 24, 2018, with English translation thereof, pp. 1-4.

(Continued)

*Primary Examiner* — Dani Fox
(74) *Attorney, Agent, or Firm* — JCIPRNET (57) ABSTRACT

Utilizing random variation (repeated positioning error) when reciprocating operation is repeatedly performed in which a stage is moved by (+x, +y) pulses toward an arbitrary position perpendicular to an optical axis of X-rays extending from an X-ray source to an X-ray detector, and then, is moved from there by (−x, −y) pulses, an image group of images obtained by moving in parallel to each other is acquired, and an image processing unit finds a deviation between the images, and acquires an input image group in which each of the images has the deviation at a subpixel level. The image processing unit executes a reconstruction processing, using the input image group in which each of the images has the deviation at the subpixel level to generate a super-resolution image.

4 Claims, 5 Drawing Sheets

(56) References Cited

OTHER PUBLICATIONS

"Written Opinion of the International Searching Authority (Form PCT/ISA/237) of PCT/JP2018/019543," dated Jul. 24, 2018, with English translation thereof, pp. 1-4.
"Search Report of Europe Counterpart Application", dated May 10, 2021, p. 1-p. 9.
R.R. Schultz et al., "Improved Definition Video Frame Enhancement," International Conference on Acoustics, Speech, and Signal Processing, vol. 4, May 1995, pp. 2169-2172.

* cited by examiner

X-RAY INSPECTION APPARATUS

CROSS-REFERENCE TO RELATED APPLICATION

This application is a 371 application of the International PCT application serial no. PCT/JP2018/019543, filed on May 21, 2018. The entirety of the above-mentioned patent application is hereby incorporated by reference herein and made a part of this specification.

BACKGROUND

Technical Field

The present invention relates to an X-ray inspection apparatus that performs X-ray photography for super-resolution reconstruction processing.

Background Art

As an apparatus configured to observe an internal structure of an industrial product or the like under non-destructive conditions, conventionally, there have been known an industrial fluoroscopic apparatus for obtaining a fluoroscopic image by irradiating an object with X-rays, and an industrial X-ray CT apparatus for obtaining a tomographic image of an object (see Patent Literature 1 JP 2006-317249 A). An X-ray detector has a light receiving region of a preset size and a preset number of pixels, and its output is digital data having a pixel value of each pixel. The visual field and a resolution of an image displayed on a display apparatus are determined by the size of the X-ray detector, the pitch of the detection elements (pixel pitch) and a magnification factor of the image, and the magnification factor is determined by a geometric magnification factor, which is a value obtained by dividing [distance from the X-ray source to the X-ray detector] by [distance from the X-ray source to the object]. An image resolution is identified by detecting the smallest line pattern that can be discerned from line patterns of a resolution chart displayed on a screen of the display apparatus when the geometric magnification factor is maximum.

SUMMARY OF INVENTION

While the geometric magnification factor can be increased by shortening the distance from the X-ray source to the object, in reality, due to the physical thickness of the object, there is a limit to shortening the distance from the X-ray source to the object.

To be precise, an X-ray source is not a point light source, and a focal point of the X-ray source is a region having a diameter of several μm (micrometers). The extent of the region of the focal point exerts deleterious effect on an image which is called blurring, and the influence of this blurring on the image becomes larger as the geometric magnification factor increases. While it is possible, by making the focal point size of the X-ray source small, to reduce blurring even in the case of photography at a high geometric magnification factor, there is a physical limit to making the focal point size small. Also, making the focal point size small generally reduces the X-ray dose emitted from the X-ray source. This leads to a problem such as an increase in image noise or an elongation in the photographing time.

As a method of increasing the geometric magnification factor, it is possible to increase the distance between the X-ray source and the X-ray detector. However, increasing the distance between the X-ray source and the X-ray detector causes a problem that the apparatus becomes large. Also, since the X-ray dose entering the X-ray detector is inversely proportional to a square of the distance from the X-ray source to the X-ray detector, increasing the distance between the X-ray source and the X-ray detector will also reduce the X-ray dose entering the X-ray detector. Therefore, the problem such as an increase in image noise or an elongated photographing time occurs.

Even in X-ray photography at the same geometric magnification factor, by using an X-ray detector having small size pixels and a large number of pixels in the preset visual field, it is possible to obtain an image of a resolution that enables smaller portions of the object to be observed. However, such an X-ray detector is expensive and causes an increase in a price of the entire apparatus. Further, in the case of an X-ray detector having small size pixels, the size of the detector itself tends to be small. When the size of the detector becomes small, the visual field when observation is performed at the lowered geometric magnification factor becomes narrower, which causes a problem that the observation becomes difficult. Furthermore, the fact that the pixel size is small means that an incident X-ray dose per pixel of the X-ray detector also decreases, which causes the problem such as an increase in image noise or an elongated photographing time. Thus, even if the specifications of the X-ray detector or the geometrical magnification factor are enhanced for observation of details of the object, there is a physical limit.

In place of changing the geometrical magnification factor of the apparatus, there is image processing called digital zoom as a method of magnifying an image and displaying it on a display apparatus. With such a simple digital zoom, the image magnification becomes large, but the image resolution does not change, so that it is difficult to obtain a clear image.

Super-resolution reconstruction processing has been proposed as a method for obtaining an image with a resolution higher than the resolution depending on the pixels of the X-ray detector. In order to perform this super-resolution reconstruction processing, it is necessary to acquire a plurality of images that are shifted by a subpixel distance from each other (an image group in which each image has a positional deviation of less than 1 pixel). X-ray equipment described in Patent Literature 1 includes a detector micromotion mechanism which moves the X-ray detector finely on a plane orthogonal to the X-ray optical axis. The detector micromotion mechanism finely moves the X-ray detector by a pitch of an integral fraction of a pixel pitch of the X-ray detector to perform X-ray photography, by which the image group in which each of the images having the positional deviation of less than 1 pixel for super-resolution reconstruction processing can be acquired.

In normal observation with a general industrial X-ray fluoroscopic apparatus, even if positions of images obtained by X-ray fluoroscopy of an object are deviated by several pixels, a user does not feel incongruity. Therefore, in normal industrial fluoroscopic apparatus that mainly performs normal observation, the positioning accuracy (i.e. minimum movement pitch) is equal to or larger than 1 pixel because of a positional relationship of the three elements of the X-ray source, the object, and the X-ray detector at which a maximum geometric magnification factor is achieved, so that positioning at a subpixel level is not possible. While the micromotion mechanism as in Patent Literature 1 addresses the problem of positioning accuracy of components, parts for realizing high positioning accuracy are often expensive, and employment of the expensive parts tends to increase the price of the apparatus itself.

The present invention has been made to solve the above problem, and an object of the present invention is to provide an X-ray inspection apparatus that can acquire an image group for super-resolution reconstruction processing even with an apparatus not having high positioning accuracy of components, and can generate a super-resolution image.

The invention according to claim 1 is an X-ray inspection apparatus including an X-ray source, a table on which an object is placed, an X-ray detector configured to detect X-rays emitted from the X-ray source and transmitted through the object, and a display unit configured to display an image acquired by X-ray photography, the X-ray inspection apparatus including: a movement mechanism configured to change a relative positional relationship among the X-ray source, the X-ray detector, and the object by moving the X-ray source, the X-ray detector, or the table; and a control unit having a movement control unit configured to control the movement mechanism, an X-ray control unit configured to control the X-ray source, an image processing unit configured to take in an output of the X-ray detector and construct an X-ray image of the object, and a display control unit configured to display the image obtained by the image processing unit on the display unit, wherein the image processing unit acquires a plurality of X-ray images by positioning the X-ray source, the X-ray detector and the table at a position the plurality of times after reciprocating any one of the X-ray source, the X-ray detector and the table between a first position where a first X-ray image is acquired and an arbitrary position, acquires, from the plurality of X-ray images, images having a positional deviation of a subpixel level with respect to one another as an input image group for super-resolution reconstruction processing by utilizing a repeated positioning error when the positioning is performed the plurality of times, and generates a super-resolution image by executing the super-resolution reconstruction processing to the input image group.

The invention according to claim 2 is the X-ray inspection apparatus according to claim 1, wherein the image processing unit acquires the positional deviation of each of the plurality of X-ray images, utilizing an alignment method between the images, and acquires, from the plurality of X-ray images, images each having the positional deviation smaller than 1 pixel of the X-ray detector as the input image group together with the positional deviations.

The invention according to claim 3 is the X-ray inspection apparatus according to claim 1, wherein the image processing unit creates a second reference image by cutting out of the first X-ray image from a base point of a predetermined position, acquires the positional deviation of each of the plurality of X-ray images, utilizing an alignment method between the images, separates the positional deviation into an integer part and a decimal part of a pixel, and cuts out an image of a same size of each of the plurality of X-ray images as the second reference image, from a base point which is a position obtained by adding the integer part of the positional deviation to the predetermined position, and acquires the cut-out image as each of images of the input image group together with the decimal part of the amount of positional deviation.

The invention according to claim 4 is the X-ray inspection apparatus according to any one of claims 1 to 3, wherein the movement mechanism is connected to the table and moves a position of the table with respect to an X-ray photography system composed of the X-ray source and the X-ray detector.

According to the inventions of claims 1 to 4, the image processing unit performs the X-ray photography a plurality of times to acquire the plurality of X-ray images after executing re-positioning between the first position and an arbitrary position the plurality of times, and acquires from the plurality of X-ray images, the images having the positional deviation of subpixel level with respect to one another as the input image group for the super-resolution reconstruction processing by utilizing the repeated positioning error when the re-positioning is repeatedly performed. Thus, even in an apparatus difficult to realize the movement at the subpixel level by operation of the mechanical element with positioning accuracy of a conventional movement mechanism, it is possible to easily acquire the input image group in which each of the images has the positional deviation of subpixel level necessary for the super-resolution reconstruction processing. Since it is not necessary to configure the movement mechanism of expensive parts having high positioning accuracy, it is possible to suppress an increase in cost of the apparatus.

According to the invention of claim 2, since by acquiring only the images each having the positional deviation smaller than 1 pixel of the X-ray detector as the input image group for the super-resolution reconstruction processing, the image processing unit can exclude the image having the repeated positioning error larger than 1 pixel of the X-ray detector, and surely acquire the input image group in which each of the images has the positional deviation of subpixel level for the super-resolution reconstruction processing.

According to the invention of claim 3, even in the image in which the positional deviation is larger than 1 pixel of the X-ray detector, it is possible to easily acquire the input image group in which each of the images has the positional deviation of a subpixel level necessary for super-resolution reconstruction processing by adjusting the position of the base point of the cutout of the image, and cutting the image. Since it is not necessary to discard the image having the positional deviation larger than 1 pixel of the X-ray detector and perform the photography again, there is an advantage that photography time does not become long.

According to the invention of claim 4, since the movement mechanism is a table movement mechanism that moves the position of the table with respect to the X-ray photography system, even in an existing apparatus in which the positions of the X-ray source and the X-ray detector are fixed, it is possible to add the function of obtaining the super-resolution image without mechanically modifying the apparatus.

DESCRIPTION OF EMBODIMENTS

Figure 1:
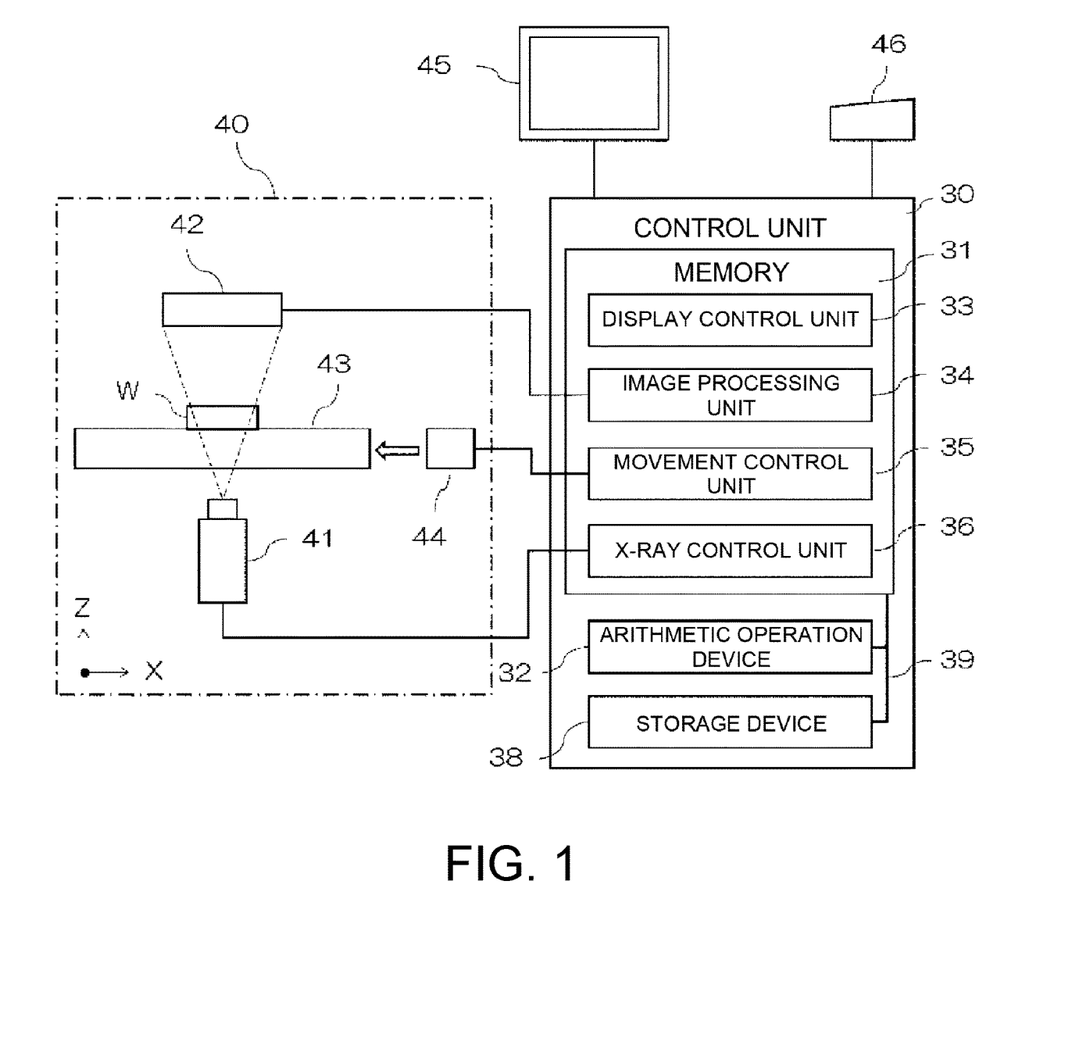
FIG. 1 is a schematic diagram of an X-ray inspection apparatus according to the present invention.

Embodiments of the present invention will be described below with reference to the drawings. FIG. 1 is a schematic diagram of an X-ray inspection apparatus according to the present invention.

This X-ray inspection apparatus includes an X-ray source 41 composed of an X-ray tube and configured to irradiate a workpiece W, which is an object, with X rays from below to above, and an X-ray detector 42 configured to detect X-rays transmitted through the workpiece W after the irradiation from the X-ray source 41, and a stage 43 configured to place the workpiece W on it. As the X-ray detector 42, a flat panel detector, an image intensifier (I. I.) or the like is employed. The X-ray source 41 and the X-ray detector 42 are disposed to face each other with the stage 43 interposed between them. The stage 43 is movable in a horizontal (an X axis and a Y axis orthogonal to each other) direction and a vertical (a Z axis) direction by an action of a stage movement mechanism 44 including a motor (not shown). By moving the stage 43 by the stage movement mechanism 44, the workpiece W can be moved relatively to an X-ray photography system composed of the X-ray source 41 and the X-ray detector 42. Note that the X-ray source 41, the X-ray detector 42, the stage 43, and the stage movement mechanism 44 are disposed inside a casing 40 configured of an X-ray shielding member.

This X-ray inspection apparatus includes a memory 31 composed of a ROM configured to store an operation program necessary for controlling the apparatus, a RAM configured to load the program when the program is executed, and temporarily store data, and an arithmetic operation device 32 such as a CPU (central processing unit) configured to execute logical arithmetic operation, and includes a control unit 30 configured to control the entire apparatus. Note that the memory 31 is connected to the arithmetic operation device 32 and a storage device 38 configured to store a super-resolution image or the like via a bus 39. Further, this control unit 30 is connected to a display unit 45 such as a liquid crystal display panel that displays an X-ray image or the like detected by the X-ray detector 42, and an operation unit 46 including a mouse or a keyboard for a user to operate and input various instructions.

The memory 31 of the control unit 30 stores programs configured to cause the arithmetic operation device 32 to operate and implement functions. In FIG. 1, the programs stored in the memory 31 are described as functional blocks. As shown in FIG. 1, the control unit 30 includes a display control unit 33 configured to cause the display unit 45 to display an image including a plurality of GUI components and X-ray images that the user can select via the operation unit 46, an image processing unit 34 configured to take in output from the X-ray detector 42 to construct an X-ray image, and executes a super-resolution reconstruction processing described later on the X-ray image, a movement control unit 35 configured to control the operation of the stage 43 by creating a specific number of pulses to be input to the motor of the stage movement mechanism 44, and an X-ray control unit 36 configured to control the X-ray irradiation from the X-ray source 41 by controlling a tube voltage/tube current or the like of the X-ray tube.

Figure 2:
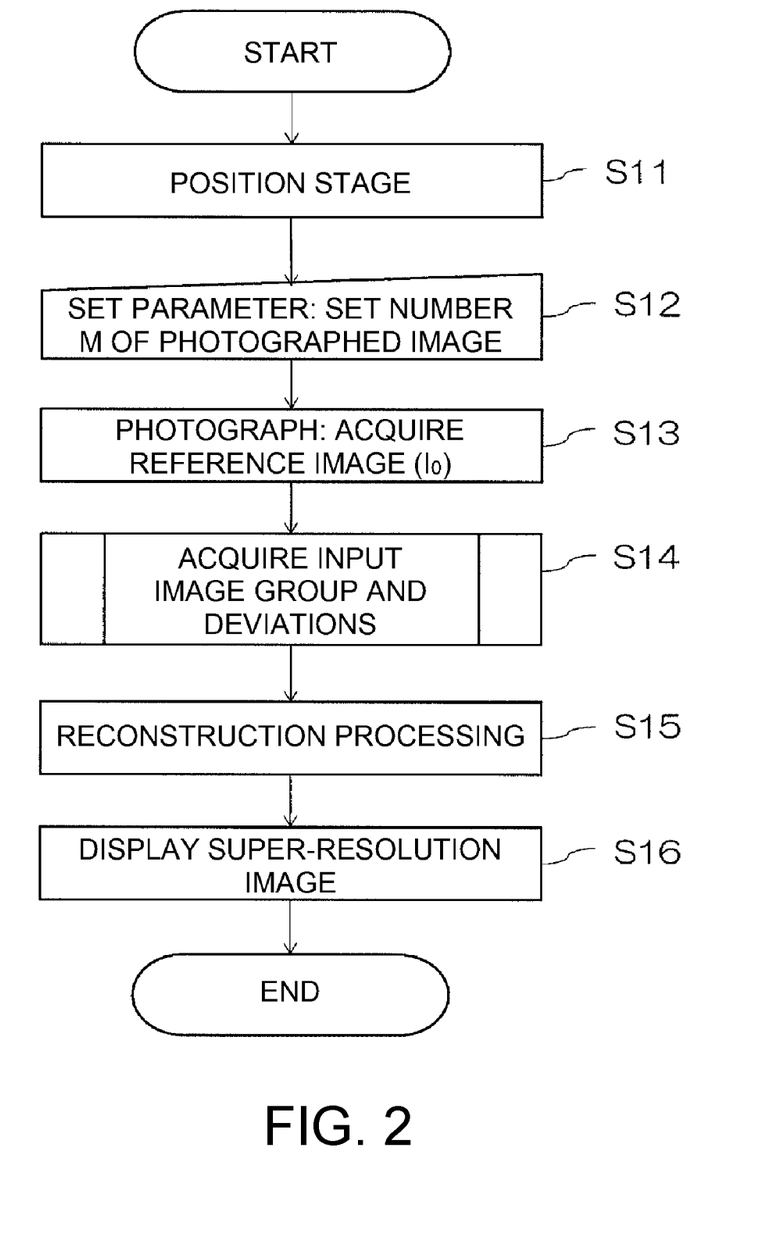
FIG. 2 is a flowchart for describing a procedure of super-resolution reconstruction processing.

FIG. 2 is a flowchart for describing a procedure of the super-resolution reconstruction processing.

The super-resolution reconstruction processing is digital image processing that creates one high-resolution image (super-resolution image) having a higher resolution than a resolution determined by specifications of the X-ray detector 42, using a plurality of images that are shifted by a subpixel distance from each other (an image group in which each image has a positional deviation of less than 1 pixel). The super-resolution reconstruction processing includes the following three steps. Firstly, the super-resolution reconstruction processing includes a step of acquiring a plurality of images (input image group) having a positional deviation at a subpixel level (an amount smaller than a size of 1 pixel of the X-ray detector 42), which occurs when the stage 43 is moved and returned to an original position, secondly includes a step of calculating a positional deviation between each of the acquired input images and a reference image before the stage is moved, and thirdly includes a reconstruction processing step of creating a super-resolution image from each of the input images and the positional deviation.

First, the control unit 30 executes positioning of the stage 43 for determining a first X-ray photography position (step S1). When the user operates the operation unit 46 to instruct the positioning of the stage 43, the control unit 30, which has received an input from the operation unit 46, creates a drive signal for the stage 43 in the movement control unit 35, and transmits the drive signal to the stage movement mechanism 44. When the stage 43 on which the workpiece W is placed is moved to an instructed position by driving the stage movement mechanism 44, a position of the workpiece W inside the casing 40 is determined. Thereby, a distance between the X-ray tube and the workpiece W, and a distance between the workpiece W and the X-ray detector 42 are determined, and a geometric magnification factor is determined.

Next, the user operates the operation unit 46 to set a parameter relating to the photography. Here, a number M of photographed images is set (step S12). M is an integer of 2 or more. When parameter setting ends, the control unit 30 executes the above-described first to third steps for the super-resolution reconstruction processing.

When the X-ray photography is executed at the current position of the stage 43 positioned in step S11, the image processing unit 34 acquires a first input image, which is a reference image ($I_0$) when the image deviation occurring due to a repeated positioning error of the stage 43 is found (step S13). Note that the repeated positioning error will be described later. Thereafter, the step of acquiring the input image group and the deviations for the super-resolution reconstruction processing is executed (step S14).

Figure 3:
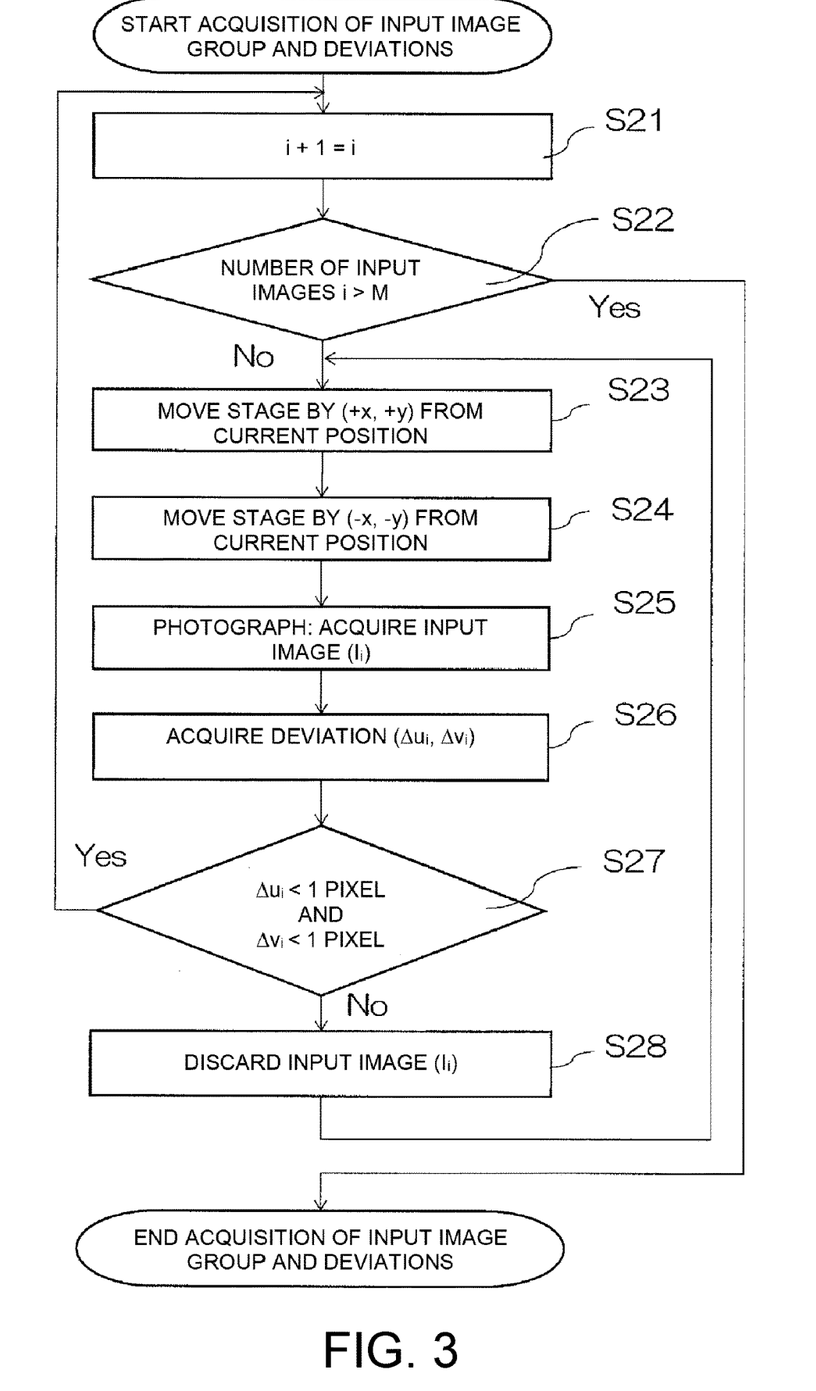
FIG. 3 is a flowchart for describing a procedure for acquiring an input image group and deviation according to a first embodiment.

Details of the step of acquiring the input image group and the deviations in step S14 will be further described. FIG. 3 is a flowchart for describing a procedure for acquiring the input image group and the deviations according to a first embodiment.

Step S14 corresponds to first and second steps of the above-described super-resolution reconstruction processing, and is a step of acquiring the input image group by executing continuous X-ray photography for the super-resolution reconstruction processing. When step S14 is started, the image processing unit 34 sequentially acquires the input image ($I_i$) and a deviation ($\Delta u_i$, $\Delta v_i$) used for the reconstruction processing (step S15) described later with respect to a first image to an M-th image. Note that i is an integer equal to or larger than zero, and i=0 is the first input image that is the reference image ($I_0$) acquired in step S13. In step S21, 1 is added to the current i (0+1=1 for the first time) to update i. The control unit 30 determines whether or not a number i of input images to be acquired is a value equal to or less than a number M of photographed images (step S22), and if the number i of input images is a value larger than the number M of photographed images, the operation of acquiring the input image group and the deviations by the image processing unit 34 ends. On the other hand, if the number i of input images is less than M, the following steps for acquiring the input image ($I_i$) and the deviation ($\Delta u_i$, $\Delta v_i$) are executed. Note that a unit of the deviation ($\Delta u_i$, $\Delta v_i$) may be a pixel or a unit of length such as mm (millimeter).

The control unit 30, by an action of the movement control unit 35, moves the stage 43 toward an arbitrary position by (+x, +y) (step S23), and then moves the stage 43 (−x, −y) (step S24). The stage 43 moves according to a signal given to the motor of the stage movement mechanism 44 from the movement control unit 35. Then, by the action of the X-ray control unit 36, X-ray photography is performed at the position of the stage 43 at that time, and the image processing unit 34 acquires the input image ($I_i$) (step S25). Note that here, x and y, which represent a driving, represent a number of pulses for driving the stage 43. That is, +x is to drive the X axis of the stage 43 in a positive direction by x pulses, and −x is to drive it in a negative direction by x pulses. Similarly, +y is to drive the Y axis of the stage 43 in the positive direction by y pulses, and −y is to drive it in the negative direction by y pulses.

When the stage 43 is moved by +x from a certain position and then moved by −x, the stage 43 numerically returns to the original position. However, in actuality, due to a positioning error caused by a mechanical movement error of the stage 43, even if a command to move to another position is given and then a command to the contrary is given, the stage 43 does not return to the exact same position as the original position, but it moves to a slightly different position each time. When such reciprocating movement is repeated, variation in a movement position has a random result close to normal distribution. Furthermore, if this operation is repeated on two axes orthogonal to each other, such as the X direction and the Y direction, the movement positions will be randomly distributed on a two-dimensional plane. In the present invention, utilizing the random variation (repeated positioning error) when the operation is repeated in which the stage 43 is moved toward an arbitrary position (+x, +y) perpendicular to an optical axis of the X-rays, which extends from the X-ray source 41 to the X-ray detector 42, and then, the stage 43 is moved from there by (−x, −y), a plurality images obtained by parallel movement to each other are acquired. Note that as a specific aspect of the repeated positioning referred to here, an aspect may be employed in which the stage 43 is driven not only so as to directly reciprocate between the two positions as described above, but also so as to finally return to a first position as a third point or later after positions of two or more points. Moreover, values of x and y are not particularly limited, but about 2 to 5 pulses are suitable.

Upon acquiring the input image ($I_i$), the control unit 30 utilizes an alignment method (registration method) between the images by the image processing unit 34 to obtain the deviation ($\Delta u_i$, $\Delta v_i$) between the reference image ($I_0$) and the input image ($I_i$) (step S26). The registration in step S26 is to measure how much the position when the input image ($I_i$) is photographed moves in parallel from the position when the reference image ($I_0$) is photographed, and as the registration method, for example, a method of finding a normalized cross-correlation between the images can be utilized.

When the deviation ($\Delta u_i$, $\Delta v_i$) is found, it is determined whether or not the deviation $\Delta u_i$ in the X direction is smaller than 1 pixel of the X-ray detector 42, and the deviation $\Delta v_i$ in the Y direction is smaller than 1 pixel of the X-ray detector 42 (step S27), and when both the deviation $\Delta u_i$ in the X direction and the deviation $\Delta v_i$ in the Y direction have values smaller than 1 pixel, the processing returns to step S21 to acquire the next input image, and one is added to i to update a value of i. When one of the deviation $\Delta u_i$ in the X direction and the deviation $\Delta v_i$ in the Y direction takes a value 1 pixel or more, or when both the deviation $\Delta u_i$ in the X direction and the deviation $\Delta v_i$ in the Y direction take values 1 pixel or more, the input image ($I_i$) is once discarded (step S28), and the processing returns to step S23 to acquire the input image ($I_i$) and the deviation ($\Delta u_i$, $\Delta v_i$) again, and the processes up to step S27 are repeatedly executed. If the deviation between the images is smaller than 1 pixel in both the X and Y directions, the image having that deviation is stored as the input image having the deviation at the subpixel level, and the processing returns to step S21 to acquire the next input image and the deviation. Steps S21 to S28 are repeated until the first to M-th input images ($I_i$) and their deviations ($\Delta u_i$, $\Delta v_i$) are acquired, and if the number i of input images to be acquired in step S22 exceeds the number M of photographed images set in step S12, the step of acquiring the input image group and the deviations (step S14) ends.

Referring back to FIG. 2, a description will be given. When the step of acquiring the input image group and the deviations (step S14) ends, the image processing unit 34 executes the reconstruction processing (step S15), using the input image group in which each of the images has the deviation at the subpixel level. This reconstruction processing is implemented by the program of the image processing unit 34 in the control unit 30. As the reconstruction processing, an iterative back projection method (IBP method) used for reconstruction of an X-ray CT image, or the like is used. Conventionally, in the case where the image resolution is increased by N times by the IBP method, it is necessary to acquire (N×N) X-ray photographed images each having a positional deviation of 1/N pixel in the vertical and horizontal directions as the input images. For example, in order to obtain a super-resolution image having a resolution four times higher than the resolution determined by the pixels of the X-ray detector 42 by the super-resolution reconstruction processing, the number M of photographed images to be set in step S12 is preferably 4×4=16. Note that, in the present invention, the plurality of images that moves in parallel to each other are acquired, utilizing the repeated positioning error when the stage 43 is repeatedly moved to an arbitrary position, and thus, the super-resolution reconstruction processing is enabled as long as the positional deviation can be accurately measured in the step of acquiring the deviation (step S4), although the positional deviation of each of the input images is not exactly 1/N pixels in the vertical and horizontal directions as in the related art. Further, since movement accuracy of the stage 43 of the stage movement mechanism 44 need not be so high that the stage 43 can move at the subpixel level, parts with high positioning accuracy need not be employed, and an increase in cost of the apparatus can be suppressed.

The super-resolution image created by the reconstruction processing (step S15) is displayed on the display unit 45 by the action of the display control unit 33 (step S16), and stored in the storage device 38. This allows the user to obtain an image having a resolution higher than the resolution determined by the pixels of the X-ray detector 42 and the geometric magnification factor.

Figure 4:
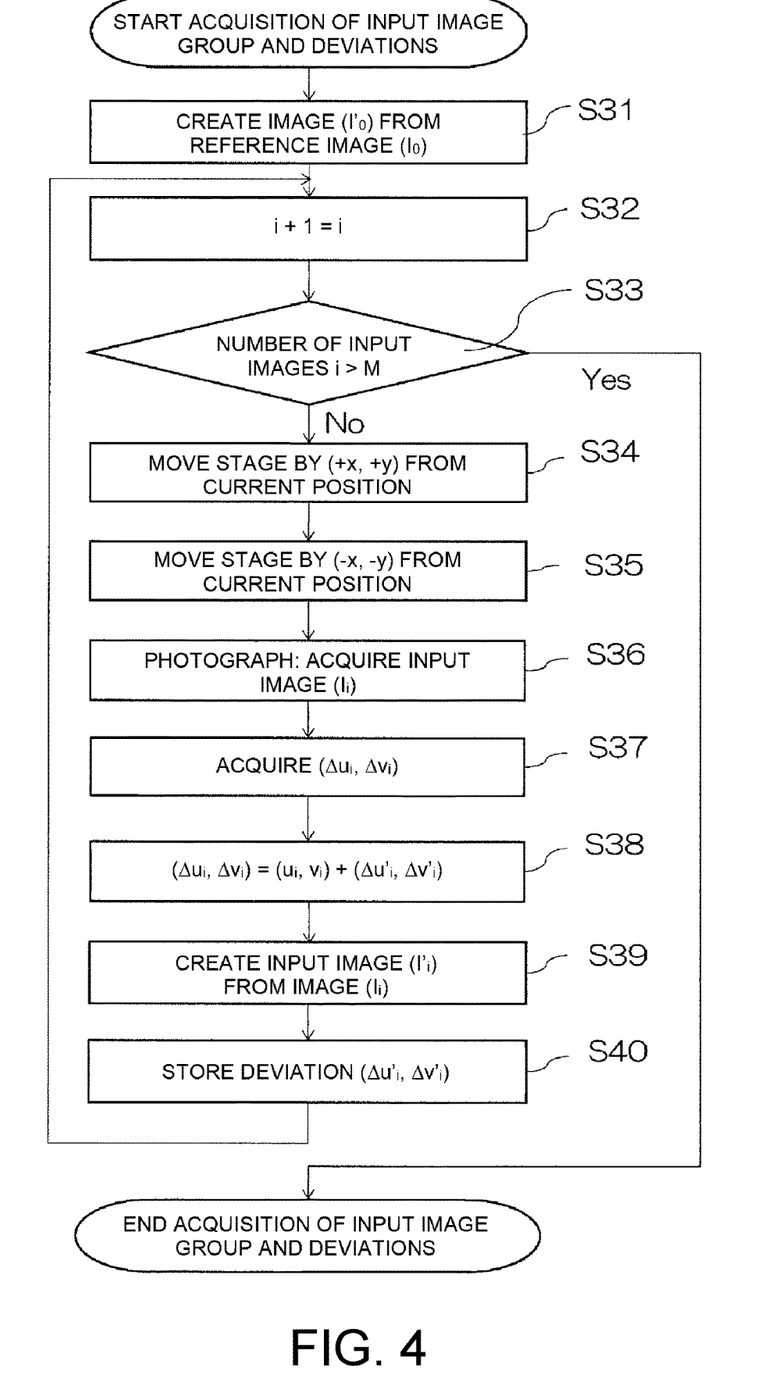
FIG. 4 is a flowchart for describing a procedure for acquiring the input image group and the deviation according to a second embodiment.
Figure 5:
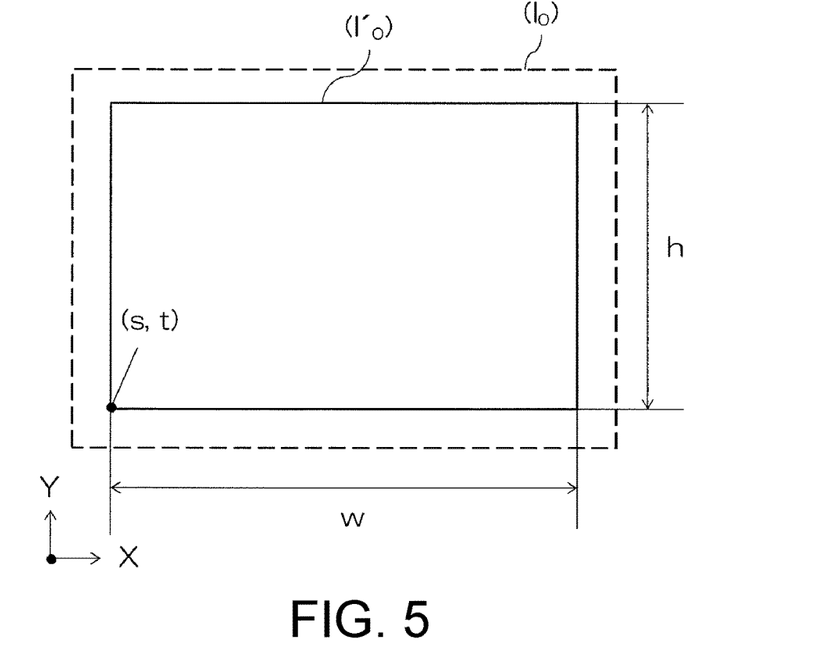
FIG. 5 is a schematic diagram for describing a step of cutting out an image acquired as each images in an input image group.
Figure 6:
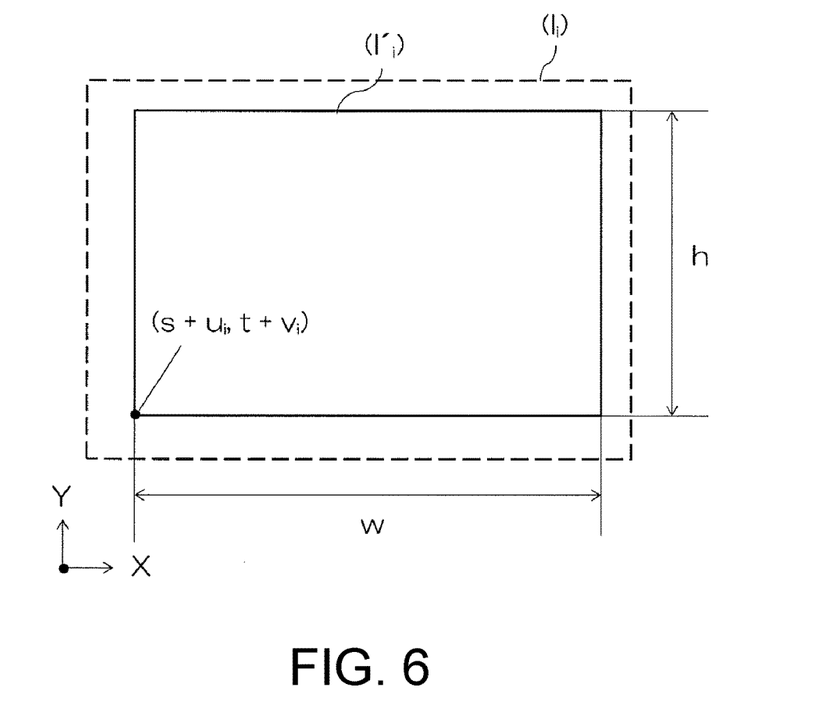
FIG. 6 is a schematic diagram for describing a step of cutting out an image acquired as each images in the input image group.

Another aspect of the step of acquiring the input image group and the deviations will be described. FIG. 4 is a flowchart for describing a procedure for acquiring an input image group and deviations according to a second embodiment. FIGS. 5 and 6 are schematic diagrams for describing a step of cutting out the images acquired as the input image group.

In the present embodiment, an image ($I'_0$) is created from the reference image ($I_0$) acquired in step S13. The image ($I'_0$) is a second reference image cut out from the reference image ($I_0$), and in the present embodiment, an input image ($I'_i$) of the same size as the image ($I'_0$) and a deviation ($\Delta u'_i$, $\Delta v'_i$) are acquired as the input image group and the positional deviation for super-resolution reconstruction processing.

As shown in FIG. 5, the control unit 30 causes the image processing unit 34 to create the image ($I'_0$) from the reference image ($I_0$) by cutting out a rectangular image having a distance w in the X direction and a distance h in the Y direction with a predetermined position (s, t) on the reference image ($I_0$) used as a base point (step S31). A unit of s, t, w, and h may be pixels, and may be a unit of length such as mm (millimeter). The cutting-out of the image ($I'_0$) may be executed by the user operating the mouse of the operation unit 46 to select a rectangular range from an arbitrary click position on the reference image ($I_0$) displayed on the display unit 45. Alternatively, in the parameter setting in step S12, s, t, w, and h may be set in advance by the user operating the keyboard of the operation unit 46 to input numerical values.

The current i (i=0 for the first time) is incremented by 1 to update i (step S32), and acquisition of the input image (I') and the deviation ($\Delta u'_i$, $\Delta v'_i$) starts from the first image. The control unit 30 determines whether or not the number i of input images to be acquired by the image processing unit 34 is a value smaller than the number M of photographed images set in step S13 (step S33), and if the number i of the input images is equal to or larger than M, the acquisition of the input image group and the deviations ends. On the other hand, if the number i of input images is smaller than M, the following step for acquiring the input image ($I'_i$) and the deviation ($\Delta u'_i$, $\Delta v'_i$) is executed.

The control unit 30 moves the stage 43 to the position (+x, +y) by the action of the movement control unit 35 (step S34), and subsequently moves the stage 43 to the position (−x, −y) (step S35). Thereafter, X-ray photography is performed at the position of the stage 43 at that time, and an image ($I_1$) is acquired (step S36).

Upon acquiring the image ($I_1$), the control unit 30 obtains the deviation ($\Delta u_i$, $\Delta v_i$) between the reference image ($I_0$) and the image ($I_i$) by the action of the image processing unit 34, using the registration method (step S37). Thereafter, the deviation ($\Delta u_i$, $\Delta v_i$) is separated into an integer part ($u_i$, $v_i$) and a decimal part ($\Delta u'_i$, $\Delta v'$) (step S38). In this step S38, if the unit of the displacement ($\Delta u_i$, $\Delta v_i$) and s, t, w, and h is a pixel, an integer part and a decimal part of the pixel unit directly separated from the deviation ($\Delta u_i$, $\Delta v_i$) are the integer part ($u_i$, $v_i$) and the decimal part ($\Delta u'_i$, $\Delta v'_i$). On the other hand, when the unit of the deviation ($\Delta u_i$, $\Delta v_i$) and s, t, w, and h are a unit of length such as mm or μm (micrometer), a value obtained by dividing the deviation ($\Delta u_i$, $\Delta v_i$) by length of 1 pixel in the X direction/Y direction is found, the value is separated into an integer part and a decimal part, and the resultant values are used as the integer part ($u_i$, $v_i$) and the decimal part ($\Delta u'_i$, $\Delta v'_i$) in the unit of the length. Thereby, the decimal part ($\Delta u'_i$, $\Delta v'_i$) becomes the deviation at the subpixel level smaller than 1 pixel.

As shown in FIG. 6, the image processing unit 34 sets, as a base point, (s+$u_i$, t+$v_i$) on the image ($I_i$) obtained by adding the integer part ($u_i$, $v_i$) to the base point (s, t) when the image ($I'_0$) is cut out from the reference image ($I_0$) in advance, and cuts out a rectangular image having the distance w in the X direction and the distance h in the Y direction as the input image ($I'_i$) (step S39). The decimal part ($\Delta u'_i$, $\Delta v'$) is stored as the deviation with respect to the cut-out input image ($I'_i$) (step S40). That is, the input image ($I'_i$) is acquired as the input image having the deviation ($\Delta u'_i$, $\Delta v'$) at the subpixel level. If the number i of input images exceeds the number M of photographed images set in step S12 (step S33), the step of acquiring the input image group and the deviations (step S14) ends.

When the step of acquiring the input image group and the deviations (step S14) ends, the image processing unit 34 executes the reconstruction processing (step S15), using the input image group in which each of the images has the deviation at the subpixel level. The super-resolution image generated by the reconstruction processing (step S15) is stored in the storage device 38, and is displayed on the display unit 45 by the action of the display control unit 33 (step S16). This allows the user to obtain an image having a resolution higher than the resolution determined by the pixels of the X-ray detector 42 and the geometric magnification factor.

In the present embodiment, the images cut out from the X-ray image are used as the input image group for the next reconstruction processing (step S15), and the deviation ($\Delta u_i$, $\Delta v_i$) between the reference image ($I_0$) and the image ($I_i$) is separated into the integer part ($u_i$, $v_i$) and the decimal part ($\Delta u'_i$, $\Delta v'_i$), and the integer part ($u_i$, $v_i$) is reflected as a base point position on the image when the input image ($I'_i$) is cut out. Thus, by adjusting the base point position on the image when the input image ($I'_i$) is cut out in accordance with the deviation ($\Delta u_i$, $\Delta v_i$) between the reference image ($I_0$) and the image ($I_i$), the image ($I'_0$) having the deviation ($\Delta u'_i$, $\Delta v'$) at the subpixel level can always be obtained. In the first embodiment, since the X-ray photography is performed again by discarding the image ($I_i$) whose deviation ($\Delta u_i$, $\Delta v_i$) between the reference image ($I_0$) and the image ($I_i$) is not less than 1 pixel, photography time may be long. However, in the second embodiment, since the situation of performing the X-ray photography again does not occur, time for acquiring the input image group and the deviations does not become longer than that in the first embodiment.

In the above-described first and second embodiments, the stage 43 is repeatedly moved in the direction perpendicular to the optical axis of the X rays (XY direction), but even when the stage 43 is moved in the Z direction, a mechanical movement error may appear as a positional deviation in the XY direction, and thus the movement direction of the stage 43 is not limited to the direction perpendicular to the optical axis of the X rays. Further, in the above-described first embodiment and second embodiment, an example of acquiring the input image group in which each of the images has the positional deviation at the subpixel level for creating a super-resolution image utilizing the repeated positioning error of the stage 43 has been described. However, the component that is repeatedly positioned is not limited to the stage 43 as long as these component can change the relative position between an X-ray photography system and the object. That is, in the case where the X-ray source 41 and the X-ray detector 42 that configures the X-ray photography system are configured to be movable in the direction perpendicular to the optical axis of the X rays (XY direction) by driving the motor, the repeated positioning error caused by the repeated movement of the components may be utilized.

In the present invention, by utilizing the repeated positioning error of the mechanical elements of the X-ray inspection apparatus, the X-ray photography is performed at randomly scattered positions on the two-dimensional plane, and the input image group necessary for super-resolution reconstruction is acquired, so that the movement accuracy of the stage 43 of the stage movement mechanism 44 need not be so high that the stage 43 can move at the subpixel level. Therefore, it is possible to add a function of obtaining the super-resolution image without replacing the movement mechanism of the existing industrial X-ray inspection apparatus with a part having a high positioning accuracy, and suppress an increase in cost of the apparatus.

Note that while in the above-described embodiment, an example in which the present invention is applied to an industrial X-ray inspection apparatus configured to perform X-ray fluoroscopic photography has been described, the present invention can also be applied to an X-ray CT photography apparatus. In the X-ray CT photography apparatus, by applying the method of the present invention at the stage of acquiring X-ray fluoroscopic data before reconstructing a tomographic image, it is possible to obtain an image with high resolution even as the finally obtained tomographic image. That is, when in order to change the relative positional relationship between the X-ray source, the X-ray detector, and the object, any one of the X-ray source, the X-ray detector, and a table on which the object is placed is configured to be movable by the movement mechanism, the present invention can be applied to obtain a super-resolution image.

The invention claimed is:

1. An X-ray inspection apparatus including an X-ray source, a table on which an object is placed, an X-ray detector configured to detect X-rays emitted from the X-ray source and transmitted through the object, and a display unit configured to display an image acquired by X-ray photography, the X-ray inspection apparatus comprising:
   a movement mechanism configured to change a relative positional relationship among the X-ray source, the X-ray detector, and the object by moving the X-ray source, the X-ray detector, or the table; and
   a control unit having a movement control unit configured to control the movement mechanism, an X-ray control unit configured to control the X-ray source, an image processing unit configured to take in an output of the X-ray detector and construct an X-ray image of the object, and a display control unit configured to display the image obtained by the image processing unit on the display unit, wherein the image processing unit
   acquires a plurality of X-ray images by positioning the X-ray source, the X-ray detector, and the table at a position the plurality of times after reciprocating any one of the X-ray source, the X-ray detector and the table between a first position where a first X-ray image is acquired and an arbitrary position,
   acquires, from the plurality of X-ray images, images having a positional deviation of a subpixel level with respect to one another as an input image group for super-resolution reconstruction processing by utilizing a repeated positioning error when the positioning is performed the plurality of times, and
   generates a super-resolution image by executing the super-resolution reconstruction processing to the input image group.

2. The X-ray inspection apparatus according to claim 1, wherein the image processing unit
   acquires the positional deviation of each of the plurality of X-ray images, utilizing an alignment method between the images, and
   acquires, from the plurality of X-ray images, images each having the positional deviation smaller than 1 pixel of the X-ray detector as the input image group together with the positional deviations.

3. The X-ray inspection apparatus according to claim 1, wherein the image processing unit
   creates a second reference image by cutting out of the first X-ray image from a base point of a predetermined position,
   acquires the positional deviation of each of the plurality of X-ray images, utilizing an alignment method between the images,
   separates the positional deviation into an integer part and a decimal part of a pixel, and
   cuts out an image of a same size of each of the plurality of X-ray images as the second reference image, from a base point which is a position obtained by adding the integer part of the positional deviation to the predetermined position, and acquires the cut-out image as each of images of the input image group together with the decimal part of the amount of positional deviation.

4. The X-ray inspection apparatus according to claim 1, wherein the movement mechanism is connected to the table and moves a position of the table with respect to an X-ray photography system composed of the X-ray source and the X-ray detector.

* * * * *